United States Patent [19]

Bednar et al.

[11] Patent Number: 4,543,850
[45] Date of Patent: Oct. 1, 1985

[54] NEUTRAL LOCK MECHANISM FOR A DIRECTION AND SPEED CONTROL PEDAL

[75] Inventors: Richard D. Bednar; James K. Hampton, both of Lake Mills, Wis.

[73] Assignee: Ransomes, Inc., Johnson Creek, Wis.

[21] Appl. No.: 506,055

[22] Filed: Jun. 20, 1983

[51] Int. Cl.⁴ ............................ G05G 1/14; G05G 5/06
[52] U.S. Cl. ............................ 74/512; 74/474; 74/527; 74/535; 74/539; 74/560; 180/335
[58] Field of Search .................. 74/478, 512, 474, 560, 74/513, 529, 527, 475, 479, 541, 542, 535, 539; 180/335; 292/121, 228

[56] References Cited

U.S. PATENT DOCUMENTS

| | | | |
|---|---|---|---|
| 1,880,583 | 10/1932 | Thorp | 74/513 |
| 2,484,592 | 10/1949 | Rodd | 74/513 |
| 2,568,454 | 9/1951 | Laverents | 74/513 |
| 3,631,740 | 1/1972 | Gavagan | 74/527 |
| 3,952,512 | 4/1976 | Feller | 74/478 |
| 4,236,853 | 12/1980 | Niggemeier et al. | 292/128 |
| 4,291,778 | 9/1981 | Slazas | 74/529 |
| 4,352,302 | 10/1982 | McAuliffe et al. | 74/512 |

Primary Examiner—Kenneth J. Dorner
Assistant Examiner—Vinh Luong
Attorney, Agent, or Firm—Andrus, Sceales, Starke & Sawall

[57] ABSTRACT

A neutral lock mechanism for a direction and speed control pedal. Forward or down-toe motion on the pedal produces forward movement of a vehicle and rear, or down-heel, motion produces rear movement, while increased displacement of the pedal in either direction will produce an increase in speed. The neutral lock mechanism includes a latch pivotally connected to the pedal and spring loaded to a latching position in which the latch will engage the floor plate of the vehicle and prevent pivotal movement of the pedal. A lever is connected to the latch and projects upwardly through an opening in the pedal. The operator's foot, when in a normal operating position, will depress the lever and release the latch while mere accidental engagement of the operator's foot with the pedal will not release the latch and will retain the pedal in the neutral lock position.

5 Claims, 4 Drawing Figures

U.S. Patent    Oct. 1, 1985    4,543,850
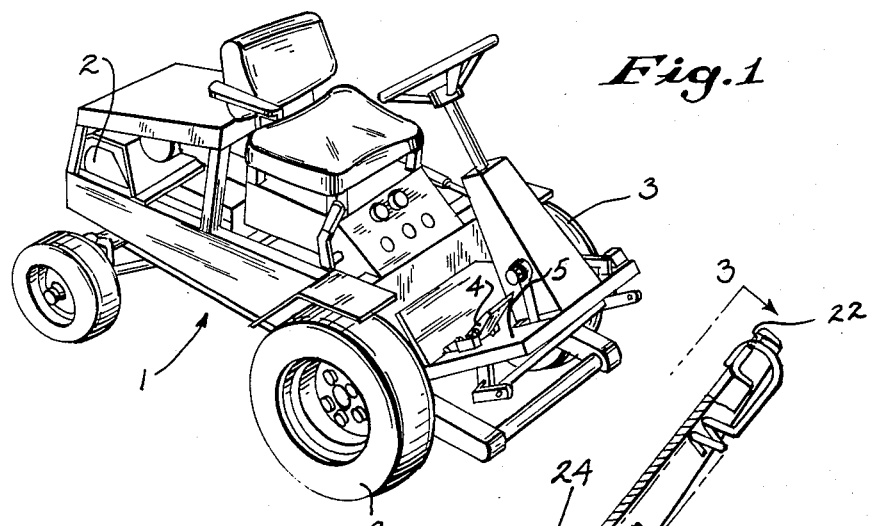
Fig.1
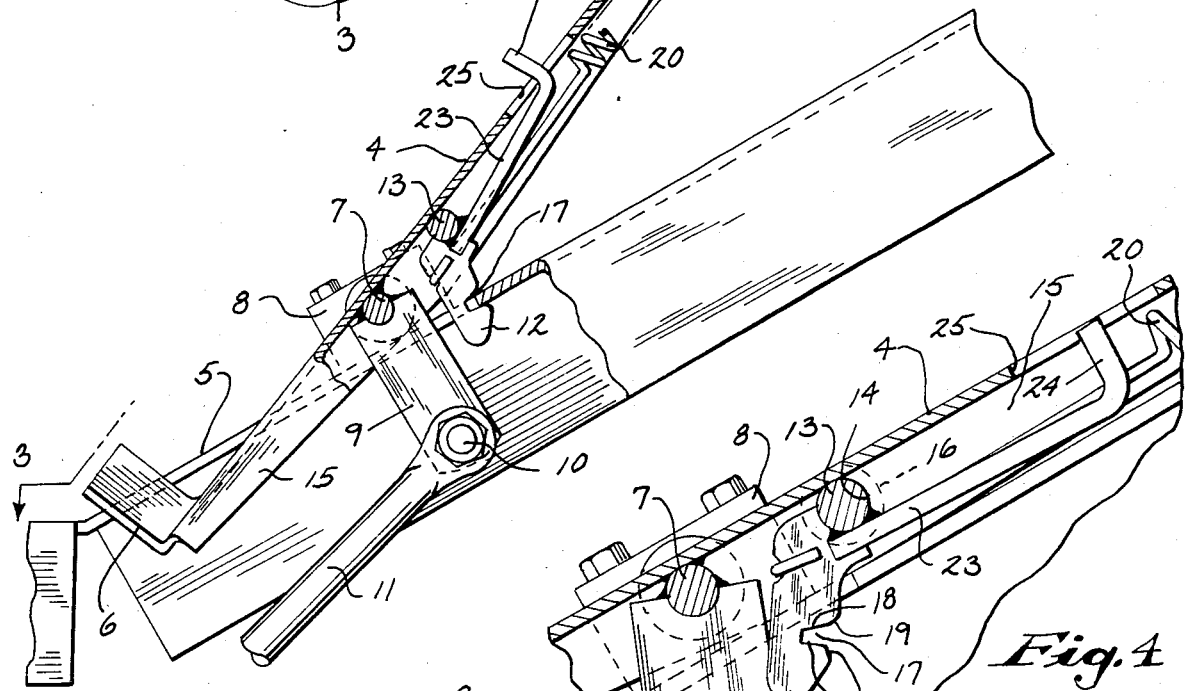
Fig.2
Fig.4
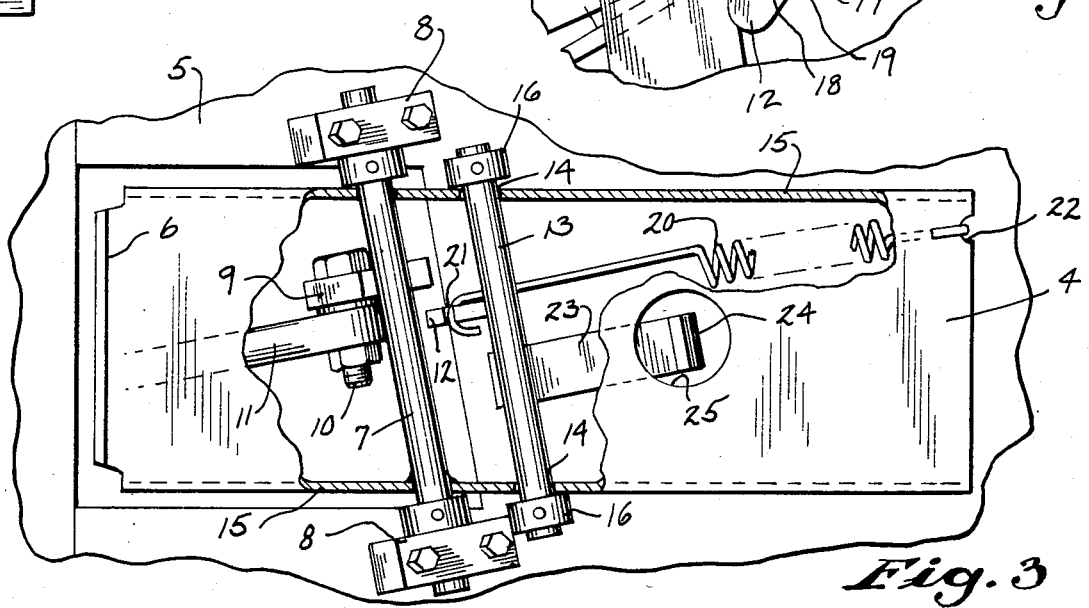
Fig.3

NEUTRAL LOCK MECHANISM FOR A DIRECTION AND SPEED CONTROL PEDAL

BACKGROUND OF THE INVENTION

Small tractors, lawnmowers and other such equipment frequently utilize a variable speed hydraulic drive with a pedal control for speed and direction. The pedal is pivoted to the floor at a location intermediate its length, and a forward or down-toe motion on the pedal will produce forward motion for the vehicle, while a rear or down-heel motion on the pedal will produce rear motion. Increased displacement of the pedal will produce increased speed in either direction.

With this type of pedal control, when the operator's foot is removed, the pedal is biased to a neutral position by a spring assembly associated with transmission so that the vehicle will not move forward or rear. It has been found that after a period of use, the spring return may not fully return the pedal to the neutral position, with the result that the vehicle may creep in either the forward or rear direction.

SUMMARY OF THE INVENTION

The invention is directed to a neutral lock mechanism for a direction and speed control pedal. In accordance with the invention, the pedal is mounted for pivotal movement on the floor plate of the vehicle at a location intermediate its length. The neutral lock mechanism includes a latch which is pivotally connected to the pedal and is spring loaded to a latching position in which a notch on the latch engages the floor plate to prevent pivotal movement of the pedal.

A lever arm is connected to the latch and is provided with a bent end which projects upwardly through an opening in the pedal. The operator's foot, when in the normal operating position, will depress the lever, thereby pivoting the latch to a release position and enabling the pedal to be pivoted in both a forward and rear direction. However, mere accidental engagement by the operator's foot with the pedal will not actuate the lever to release the latch and will thus retain the pedal in a neutral locked position.

The mechanism of the invention provides a positive lock for the drive in neutral position and prevents accidental movement of the pedal.

Further, the mechanism provides a positive return to the neutral position, so that it is not possible for the vehicle to creep either in the forward or reverse direction when unattended.

In addition, the neutral locking mechanism of the invention will be automatically engaged when the operator removes his foot from the pedal, and similarly, will be automatically released when the operator's foot is placed on the pedal in its normal operating position.

As a further advantage, the mechanism is simple and inexpensive and can be readily adapted to any type of direction and speed control pedal.

Other objects and advantages will appear in the course of the following description.

DESCRIPTION OF THE DRAWINGS

The drawings illustrate the best mode presently contemplated of carrying out the invention.

In the drawings

FIG. 1 is a perspective view of a lawnmower tractor incorporating the neutral lock mechanism of the invention;

FIG. 2 is a side elevation of the pedal and lock mechanism with the lock in the latched position;

FIG. 3 is a top plan view of the pedal with parts broken away; and

FIG. 4 is an enlarged view similar to FIG. 2 showing the lock in the unlatched position.

DESCRIPTION OF THE ILLUSTRATED EMBODIMENT

FIG. 1 shows a vehicle 1, such as a lawnmower tractor, having an internal combustion engine 2 which operates in a conventional manner through a variable speed hydraulic drive, not shown, to drive the wheels 3. A pedal 4 mounted for pivotal movement on the inclined floor plate 5 is used to provide directional movement, i.e. forward or rear, and variable speed control. In the conventional manner, forward or down-toe motion on the pedal will produce forward motion for the vehicle and rearward or down-heel motion on the pedal will produce rear motion for the vehicle. Increased displacement or pressure on the pedal increases the speed in either the forward or reverse direction in a conventional way.

As best shown in FIGS. 2 and 3, pedal 4 is provided with a heel rest 6 and is mounted for pivotal movement by shaft 7, which is secured to the undersurface of the pedal at a location intermediate its length. The ends of shaft 7 project beyond the sides of pedal 4 and are journalled within suitable bearings or bushings 8 mounted on floor plate 5.

To connect the pedal to the hydraulic drive, a lug 9 is welded or otherwise secured to the undersurface of the pedal and the lower end of lug 9 is connected by pin 10 to a control rod 11 which operates the variable speed drive unit in a conventional manner. With this connection, downward force applied by the operator's foot on the forward portion of the pedal will pivot the lug 9 rearwardly to move the control rod 11 in a rear direction to thereby actuate the hydraulic drive and provide forward movement for the vehicle. Conversely, down-heel force applied to the pedal will pivot lug 9 forward to thereby move control rod 11 in a forward direction and provide reverse movement for the vehicle through the hydraulic drive in a conventional manner.

The neutral lock mechanism of the invention includes a latch 12 which is secured to a rod 13 mounted for pivoting movement within a pair of notches 14 formed in the side flanges 15 of the pedal. To maintain the rod within the notches 14, the outer projecting ends of rod 13 receive set collars 16.

As best shown in FIG. 2, the forward edge of latch 12 is provided with a notch or recess 17 and when the latch is in a latching position, notch 17 engages the edge of the floor plate 5 as shown in FIG. 2. Engagement of the latch with the floor plate will prevent pivotal movement of pedal 4.

As best illustrated in FIG. 4, the edges 18 of the latch bordering the notch 17 are tapered, diverging outwardly at an angle of about 5° to 10°, and the outer end of each edge 18 is provided with a chamfer 19 which is at an angle of about 45° with respect to the center line of the notch. The chamfered edges 19 serve to guide the latch into position with respect to the floor plate and facilitates engagement of the floor plate with the notch. In the latched position the floor plate 5 will not bottom out in notch 17 but instead will engage the tapered side edges 18. This insures that the latch 12 will engage the floor plate securely without play or looseness in the neutral locked position. Furthermore, the taper automatically adjusts to various floor plate thicknesses and wear of the parts to maintain a precise lock to the floor plate at all times.

Latch 12 is biased to the latching position by an extension spring 20. One end of the spring is engaged with notch 21 in the rear edge of latch 12, while the opposite end of spring 20 is engaged with a notch 22 in the forward end of pedal 4. With this arrangement the force of the spring will urge the latch 12 in a forward direction to the latching position.

To release the latch 12 from its latching position, a lever 23 is fixed to rod 13 and latch 12. As shown in FIG. 2, the lever extends beneath the pedal 4 and the forward end of the lever is provided with a bent end 24 which projects upwardly through a hole 25 in pedal 4. When the operator places his foot in the normal operating position on pedal 4, the end 24 of lever 23 will be depressed, thereby pivoting the latch 12 against the force of spring 20 to the release position, where it will be out of engagement with floor plate 5. With the latch released the pedal can then be operated in the normal manner. When the operator removes his foot from pedal 4, a spring biasing mechanism associated with the variable speed transmission will act through control rod 11 to return the pedal to a neutral position. In addition, spring 20 will urge the latch 12 forwardly to bring the notch 17 into engagement with the floor plate 5 and thereby insure that the pedal will be locked in a neutral position. In the locked neutral position, the bent end 24 will project upwardly through hole 25. However, accidental contact with the pedal by the operator's foot, or by some outside object will normally not depress the end 24, so that the transmission will be locked in a neutral position. It is only when the operator places his foot in the normal operating position on pedal 4, that lever end 24 be depressed to move latch 12 to the release position.

The neutral lock mechanism of the invention provides a positive lock for the drive in neutral which prevents accidental movement of the transmission into forward or reverse. Moreover, the mechanism provides a positive return to neutral, thereby eliminating any possibility of the vehicle creeping when unattended.

As a further advantage, the locking mechanism is automatically engaged and disengaged by the operator's foot and it is not necessary for the operator to undertake any independent action to either engage or disengage the lock.

Various modes of carrying out the invention are contemplated as being within the scope of the following claims particularly pointing out and distinctly claiming the subject matter which is regarded as the invention.

I claim:

1. In a direction and speed control for a vehicle, a floor plate, a pedal pivotally mounted intermediate its ends to said floor plate, down-toe motion by the operator's foot on the pedal causing forward motion of the vehicle, and down-heel movement by the operator's foot causing rear movement of the vehicle, a latch pivotally connected to the underside of the pedal and movable between a latching position wherein said latch engages an edge of the floor plate and an unlatching position, biasing means for urging the latch to the latching position, and a lever arm secured to said latch and disposed beneath the pedal, said pedal having an opening therein and the end of said lever being bent and projecting upwardly through said opening to a location where said end can be engaged by the operator's foot when in a normal operating position, depressing of said end by the operator's foot acting to pivot said latch from the latching to the release position against the force of said biasing means to thereby permit pivotal movement of said pedal.

2. The mechanism of claim 1, wherein said opening is located generally centrally of said pedal.

3. The mechanism of claim 1, wherein said latch has a notch disposed to engage the edge of said floor plate, said notch having a generally flat base and a pair of side edges that diverge outwardly from said base, said floor plate disposed to engage said side edges when the latch is in the latching position.

4. The mechanism of claim 3, wherein the outer extremity of each side edge extends at a diverging angle of about 45° with respect to the respective side edge.

5. In a direction and speed control mechanism for a vehicle, a floor plate having an opening therein, a pedal pivotally mounted intermediate its ends to said floor plate, toe down motion by the operator foot on the pedal causing forward movement of the vehicle and heel down motion by the operator's foot causing rear movement of the vehicle, said pedal having a hole therein located forwardly of the pivotal connection of the pedal to the floor plate, means pivotally connected to the under-side of the pedal and including a latch disposed to engage an edge of the floor plate bordering the forward portion of said opening, a release lever connected to the latch and disposed to extend upwardly through the hole when the pedal is in a neutral position, said last named means also including a biasing member operably connected to the latch for biasing the latch to the latching position, engagement of the release lever by the operator's foot moving the latch from the latching position to the release position whereby the pedal can then be freely pivoted about its mounting.

* * * * *